United States Patent [19]
Yip et al.

[11] Patent Number: 5,790,658
[45] Date of Patent: Aug. 4, 1998

[54] HIGH PERFORMANCE ECHO CANCELLER FOR HIGH SPEED MODEM

[75] Inventors: Phillip C. Yip; Terry Cole, both of Austin, Tex.

[73] Assignee: Advanced Micro Devices, Inc.

[21] Appl. No.: 739,009

[22] Filed: Oct. 28, 1996

[51] Int. Cl.$^6$ ............................................. H04M 9/00
[52] U.S. Cl. ..................... 379/406; 379/399; 379/410; 379/411; 370/290; 364/724.01
[58] Field of Search ................... 379/406, 410, 379/399, 411, 402, 407; 370/290, 276, 282, 286, 289; 364/724.19, 724.01

[56] References Cited

U.S. PATENT DOCUMENTS

| | | | |
|---|---|---|---|
| 4,142,075 | 2/1979 | Olschewski | 379/405 |
| 4,845,746 | 7/1989 | Li | 379/411 |
| 4,987,569 | 1/1991 | Ling et al. | 379/410 |
| 5,132,963 | 7/1992 | Ungerboeck | 379/410 |
| 5,253,291 | 10/1993 | Naseer et al. | 379/406 |
| 5,287,406 | 2/1994 | Kakuishi | 379/404 |
| 5,325,396 | 6/1994 | Critchlow et al. | 375/216 |
| 5,521,949 | 5/1996 | Huang et al. | 375/261 |
| 5,559,881 | 9/1996 | Sih | 379/410 |
| 5,661,718 | 8/1997 | Bremer et al. | 370/207 |

OTHER PUBLICATIONS

Weinstein, Stephen B., "A Passband Data–Driven Echo Canceller for Full–Duplex Transmission on Two–Wire Circuits," IEEE Transactions on Communications, vol. COM–25, No. 7, Jul. 1977, pp. 654–666.

Werner, Jean-Jacques, "An Echo–Cancellation–Based 4800 Bit/s Full–Duplex DDD Modem," IEEE Journal on Selected Areas in Communications, vol. SAC–2, No. 5, Sep. 1984, pp. 722–730.

*Primary Examiner*—Krista Zele
*Assistant Examiner*—Jacques M. Saint-Surin
*Attorney, Agent, or Firm*—Kevin L. Daffer; Conley, Rose & Tayon

[57] ABSTRACT

An architecture for echo cancellation in communication networks is provided that uses a multi-stage adaptation algorithm which operates on echo cancellation filters of different configurations. When each of the configurations exhibit increased sensitivity to a different adaptation parameters, the resulting architecture gains an increased estimation accuracy. The increased accuracy readily translates into improved echo cancellation performances. In one embodiment, the architecture includes a baseband filter configuration and a passband filter configuration for echo cancellation. The increased adaptation sensitivity of the baseband filter configuration allows a more accurate estimate of the frequency offset. This estimate may then used by the passband filter configuration to attain a better echo cancellation performance.

8 Claims, 3 Drawing Sheets

HIGH PERFORMANCE ECHO CANCELLER FOR HIGH SPEED MODEM

BACKGROUND OF THE INVENTION

1. Field of the Invention

This invention is related to the field of echo cancellation in communication networks employing hybrid transformers, and more particularly to an echo cancellation system that uses more than one adaptation stage for training echo cancellation filters.

2. Description of the Relevant Art

Telephone networks commonly employ two-wire bi-directional communication lines which connect a subscriber, such as a telephone set in a home or office, to the network central office. In general, two-wire bi-directional communication lines are used in the subscriber loop for reduced cost. However, other communication paths in the telephone network, such as trunks between central offices, use four-wire communication lines. Four-wire communication lines have separate transmit and receive paths and provide better transmission quality due to the fact that each path may be separately optimized. Another advantage of four-wire lines is that communication techniques such as frequency division multiplexing (FDM), which require separate transmit and receive paths, may be employed. Given the application and relative placement of local two-wire and digital four-wire circuits, a need exists for forming a connection between those circuits. Typically hybrid transformers are used.

Central office line controller circuits frequently use hybrid transformers to provide two-wire to four-wire circuit conversion. Hybrid transformers are also widely used in digital terminal equipment such as digital cordless telephone base stations, digital telephone answering devices, etc.

With the use of a hybrid transformer, four-wire communication lines may be used in most of the telephone network, providing increased transmission quality while less expensive two-wire lines are principally used in the subscriber loop. However, the problem of impedance mismatch is introduced at the two-wire to four-wire interfaces, namely at the hybrids. This impedance mismatch results in the transmit path signal reflecting back to the receive path at the conversion point. This reflection introduced primarily in the hybrid is commonly referred to as "echo". The amount of echo a hybrid generates depends on the ability of the hybrid to separate the receive and transmit paths and the line load conditions. On a long, heavily loaded loop, the echo effect will be larger. Typical echo is about 10 to 16 dB below the source signal without an echo canceler. This significantly restricts the reliability of two-way data transfer. Possibly worse, in some cases, the echo can cause telephony equipment to malfunction. This is a common problem on full-duplex modems, DTMF detectors on telephone answering machines, and other such devices. Hence, echo cancellation is commonly used in such circuits to reduce echo problems.

Echo can originate not only from reflection on the line but also acoustic reflection (e.g., speaker phone application). Whatever the source of echo, the result is annoying to the user. Not only might the user hear an echo of his or her voice, but worse yet, may be incapable of effectively receiving certain remote commends. A problem known as "double talking" may occur which can deleteriously effect reception of certain remote commands. Double-talking occurs where the communication line is transmitting and receiving simultaneously. By way of example, consider a digital telephone answering machine with a dual-tone multifrequency (DTMF) detector. An answering machine typically includes a DTMF detector to enable a person to control his answering machine locally or from a remote telephone keypad using DTMF tones, i.e. touch 2 for forward, 3 for rewind, 4 for stop, and 5 to leave a memo, etc. When the answering machine is in playback mode, the played speech on the transmit path echoes back to the receive path. If the user at a remote telephone is also entering DTMF commands, this may cause the DTMF detector to not be able to detect the remote DTMF commands. In other words, if speech is being played, such as the answering machine greeting or a recorded message, and is echoed back to the answer machine, and if the DTMF detector is receiving tones, the DTMF detector may have difficulty detecting the DTMF signals which are mixed with the presence of speech. As a result, the answering machine may miss the command. Hence, employment of an echo canceler in this case would be useful.

Prior art echo cancellation methods include measuring the impulse response of the hybrid and then constructing a balancing filter that has the same characteristics as the hybrid. The filter receives the transmit path signal and generates an estimate of the echo. On the receive path, the echo estimate is subtracted from the actual received signal. The result is the echo canceled transmit signal.

If the line or transmission condition never changes and the response of the hybrid can be easily and accurately measured, a balancing filter which performs echo cancellation (hereafter, also called an echo canceling filter) can be readily produced given the fixed characteristics under which the filter operates. Unfortunately, in a practical (non-ideal) telephone network, the line and transmission conditions constantly change. With these changes, it is essential to adaptively change the characteristics of the filter to match the changes experienced by the line. Namely, the filter coefficients must be capable of being changed quickly so that the echo cancellation is both timely and accurate. An adaptive balancing filter updates its coefficients based on the transmit path signal and an error signal. A commonly used error signal is the difference between the actual received signal and the echo estimate.

The update process by which the filter coefficients are repeatedly adjusted to eventually match the network conditions and thereafter track the conditions as they change is known as the convergence process. The state of the filter when the coefficients have substantially achieved their optimal values is herein referred to as the convergence point. The abbreviated term "convergence" is commonly used to refer to both the convergence process and the convergence point, and the exact meaning must be determined from the context in which it is used. The use of the abbreviated term will be avoided herein.

Often adaptive balancing filters which perform echo cancellation are implemented as digital signal processors which adaptively compute the coefficients of the filter. The popular methods to compute filter coefficients are variations of the least mean square (LMS) method because of its low computational complexity and good stability. LMS algorithms can be classified as full LMS, sign-sign, sign-error, leaky LMS, normalized LMS, etc. Each version has its advantages and disadvantages.

A few criteria are commonly used in evaluating the quality of an echo canceler. The first is the speed of convergence, including the speed of the initial convergence process and the speed to regain the convergence point when the line condition changes. The convergence speed determines the average time for the filter coefficients to reach the convergence point given a "distance" between the current state and the convergence point. A higher convergence speed provides a smaller time to reach the convergence point.

A second criteria is the signal to distortion ratio (SDR), which is expressed as a ratio of signal power to distortion power. The distortion power may be estimated by comparing the received signal to a theoretical ideal calculated assuming no channel noise and no echo components. The following equation measures the echo cancellation accuracy:

$$SDR = \frac{\sum_{n=0}^{N-1} r^2(n)}{\sum_{n=0}^{N-1} d^2(n)}$$

In the above equation, r(n) is the sampled receive signal, d(n) is the difference between the sampled received signal and the theoretical ideal, n is a sample index and N is the measurement frame size. Better echo cancellation performance corresponds to a larger SDR. In some telecommunications applications, a minimum SDR is required. Clearly, the goal is to design an echo canceller that converges fast, and cancels echo well.

A brief discussion of the LMS algorithm is provided here. Further details may be found in many standard textbooks on adaptive filter theory. In the full LMS algorithm, filter coefficients are calculated according to the following equation:

$$w_k(n+1) = w_k(n) + u_1 \, e(n) x(n-k), \quad k=0, 1, \ldots, N-1$$

In the LMS sign-sign algorithm, the filter coefficients are calculated using:

$$w_k(n+1) = w_k(n) + u_2 \, \text{sign}(e(n)) \text{sign}(x(n-k)), \quad k=0, 1, \ldots, N-1$$

In the above equations n is a sample index, $W_k(\ )$ is a filter coefficient, $u_1$ and $u_2$ are step sizes, e( ) is an error signal, x( ) is the sampled transmit path signal, k signifies one of the filter coefficients, N is the number of filter coefficients and sign( ) takes an algebraic sign of its argument.

When employing an LMS algorithm to calculate filter coefficients, the step size used is a crucial factor in determining the convergence speed and stability of the filter. If the step size is too large, the noise added into the operation will cause the adaptive algorithm to diverge. On the other hand, if the step size is too small, the filter coefficients may take a long time to converge. When employing a fixed point implementation on the DSP (i.e. using a fixed point processor), if the step size is too small, the balance filter coefficients will not be updated, and as a result the LMS algorithm never converges to the optimal state. This occurs because the coefficient update value, which is the product of the step size and error value, becomes a value which is smaller than the smallest difference between possible fixed precision coefficient values.

The step size of an LMS algorithm is upper bounded by twice the reciprocal of the largest eigenvalue $\lambda_{max}$ of the correlation matrix of the transmit path signal. The step size also has a lower bound, determined by quantization of the update value of the filter coefficients. To ensure the filter coefficient values are updated, the update must be larger than the smallest quantization value of the update. The condition under which the $i^{th}$ coefficient of the balance filter stops updating is:

$$|u \, e(n) x(n-i)| < \delta/2$$

In the above equation u is the step size, e( ) is the sampled error signal, x( ) is the sampled transmit path signal, and $\delta$ is the increment between two consecutive legal quantizer output levels. The lower bound on step size u is then given by:

$$u > \sqrt{\frac{\delta^2}{4\sigma_x^2 \epsilon_{min}}}$$

where $\sigma_x^2$ is the average power of transmit path signal, and $\epsilon_{min}$ is the minimum power of the error signal at steady state, that is, at the convergence point.

The convergence speed of the LMS algorithm, t, is inversely proportional to the step size μ:

$$t = \frac{1}{u\lambda_{min}},$$

wherein $\lambda_{min}$ represents the smallest eigenvalue of the correlation matrix of the transmit path signal. It should be noted that a trade-off exists in the choice of the step size. Within the allowed range of step sizes, a larger step size leads to a reduced time for reaching the convergence point, but a smaller step size provides for a reduced variation in the steady state estimate. Hence, a more accurate estimation of the filter coefficients is provided by a smaller step size. However, because the accuracy which is achievable by simply reducing the step size is often insufficient, other avenues must be explored.

SUMMARY OF THE INVENTION

The problems outlined above are in large part solved by an architecture that includes a multi-stage adaptation algorithm which operates on echo cancellation filters of different configurations. When each of the configurations exhibit increased sensitivity to a different adaptation parameters, the resulting architecture gains an increased estimation accuracy. The increased accuracy readily translates into improved echo cancellation performances.

Broadly speaking, the present invention comprises a system and method for performing echo cancellation in a communications network which experiences reflections of a transmit signal which interfere with a receive signal during full-duplex operation. The system includes an echo canceler with a passband signal filter configuration and a baseband signal filter configuration. Each filter configuration has its own adaptation algorithm module. The increased sensitivity of the baseband signal filter configuration to the estimation of an offset frequency is used to provide an accurately estimated parameter to the passband signal filter configuration, thereby allowing improved echo cancellation performance by the passband filter configuration.

The present invention further contemplates a modem with echo canceling ability, wherein the echo canceling ability is provided by more than one echo canceling filter configuration. The modem comprises an adaptive baseband filter configuration and an adaptive passband filter configuration. The adaptive passband filter configuration achieves an improved echo cancellation performance in part due to a more accurate estimate of an offset frequency parameter provided by the adaptive baseband filter configuration.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
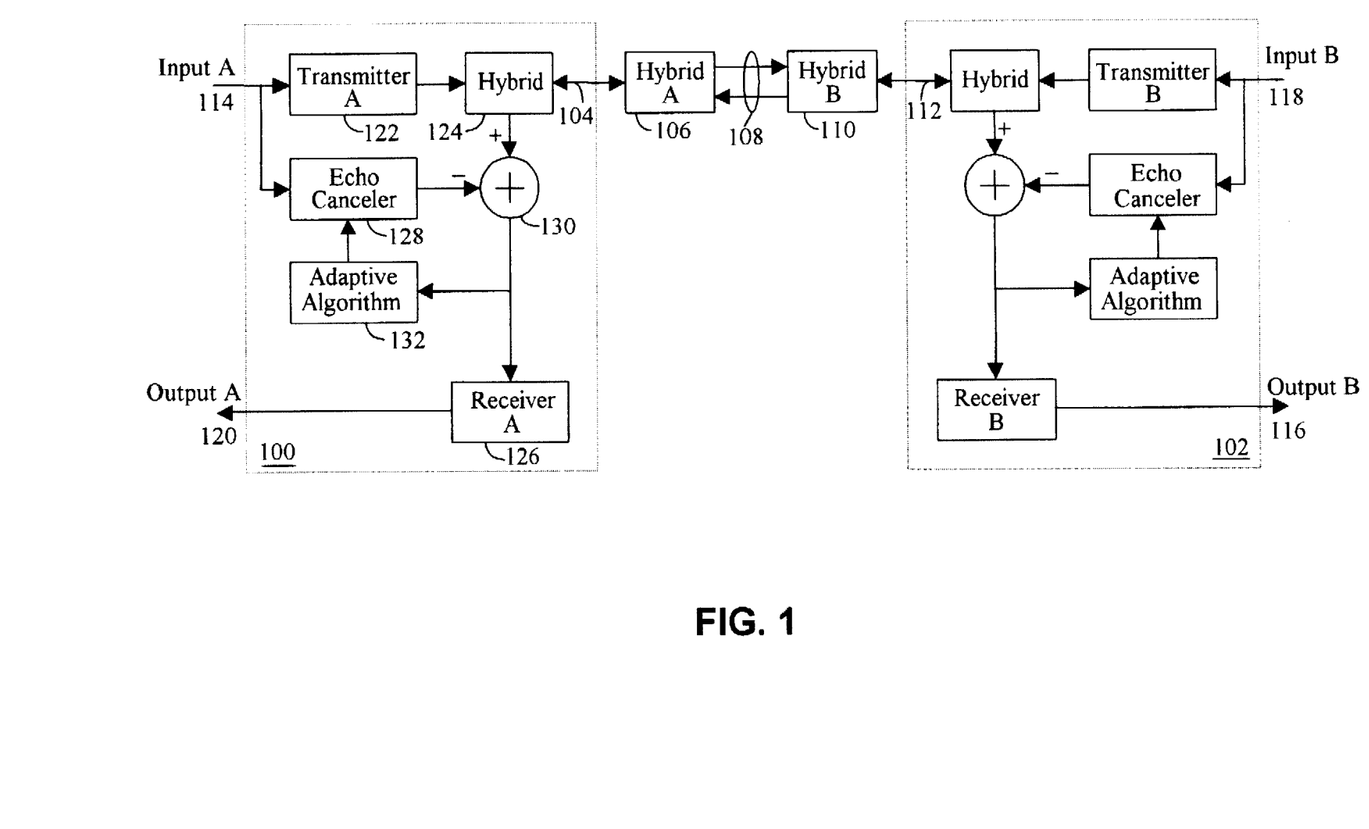
FIG. 1 is a signal flow diagram of a communications network using echo cancellation.

Referring now to FIG. 1, an idealized signal flow diagram of a communications network is shown. This configuration serves to deliver data from a local input terminal 114 to a remote output terminal 116 while simultaneously delivering data from remote input terminal 118 to local output terminal 120. A local modem 100 is coupled to a remote modem 102 via communications channel comprised of a local two-wire bi-directional signal path 104, a local hybrid 106, a four-wire signal path 108, a remote hybrid 110, and a remote two-wire bi-directional signal path 112.

Local modem 100 comprises a transmitter 122 coupled to receive data from local input terminal 114 and configured to deliver a transmit signal representative of input data via a hybrid transformer 124 to the communications channel described previously. Local modem 100 further comprises a receiver 126 coupled to accept a receive signal delivered via hybrid transformer 124 from the communications channel described previously. Hybrid transformer 124 is necessary for full-duplex operation of local modem 100 on local two-wire bi-directional signal path 104. Due to reasons which will be discussed below, it is expected that the receive signal will contain an echo of the transmit signal. It being advantageous to have the echo removed, local modem 100 further comprises echo canceler 128. Echo canceler 128 is coupled to receive data from local input terminal 114 and configured to deliver a replica of the echo contained in the receive signal. For this reason, echo canceler 128 adjusts the coefficients of an adaptive balancing filter in accordance with an algorithm responsive to the receive signal. A summer 130 is coupled to accept the echo replica from echo canceler 128 and configured to subtract the echo replica from the receive signal thereby "canceling" the echo contained in the receive signal.

Local hybrid 106 functions as an interface between local two-wire bi-directional signal path 104 and four-wire signal path 108. The transmit signal and the receive signal are each carried in isolation. The isolation is provided by two uni-directional two-wire signal paths which make up the four-wire signal path. An inductive coupling provided by the hybrid is designed to preserve this isolation while permitting transfer of the receive and transmit signals to and from a bi-directional two-wire signal path. All hybrids in the communications network are designed to function in this manner. However, impedance mismatches occur at the interfaces in the hybrid which in effect undermine the isolation and allow signal coupling between the transmit and receive paths. This coupling creates an echo of the transmit signal which returns along the receive path as part of the receive signal.

The plurality of hybrids creates a multiplicity of echoes, but the overall accumulation of echoes appears essentially as two smeared echoes. The two echoes are separated in time. The first echo is attributable to coupling in the local part of the channel, and is commonly termed the "near echo". The second echo is attributable to coupling in the remote part of the channel and is commonly termed the "far echo". The signals which pass through only the local part of the communications channel experience very little in the way of nonlinear effects. For this reason, the near echo may be accurately expressed as a linear function of the transmit signal. However, signaling across the four-wire portion of the channel is often done using nonlinear modulation techniques. Consequently, the far echo which is generated by remote portions of the channel often experiences a nonlinear transformation. This transformation can be well approximated as a modulation of the input symbols by a different carrier frequency. This new carrier frequency is typically expressed relative to the original carrier frequency, i.e. as a frequency offset. One further characteristic of the far echo is that typically it is greatly attenuated relative to the near echo.

The characteristics of the communications channel are variable, so the near and far echoes change with respect to time. Consequently, echo canceler 128 must be adaptive to these changes. For this reason, local modem 100 further comprises an adaptive algorithm module 132. Adaptive algorithm module 132 is coupled to accept the output of summer 130 and thereafter apply an adaptation update to echo canceler 128. The adaptation is governed by an algorithm such as the LMS algorithm described previously. The adaptive update is therefore based on the previous echo-canceled output from summer 130. The update occurs through the feedback arrangements shown.

The signal lines depicted inside modem 100 are generic in the sense that they may be used to carry either real-valued or complex-valued signals. Complex numbers are numbers having a real component and an imaginary component. Complex values are a common way of representing two-dimensional signals such as those used for quadrature amplitude modulation (QAM) and quadrature phase-shift keying (QPSK). Hereinafter, complex-valued signals will be carried by a pair of signal lines, while real values signals will be carried by a single signal line. Additionally, the echo replica signal shown actually comprises two signals, a near echo replica signal and a far echo replica signal. Consequently, though the FIG. 1 depicts the use of only one summer being used to perform echo cancellation in modem 100, two summers will be used to provide the echo cancellation in the detailed depictions of the echo cancellation apparatus. It should be recognized that the two summers in the detailed depictions are the functional equivalent of summer 130.

It is noted that the term symbol is herein used to refer to a discrete-time, discrete-amplitude signal (i.e. a sample of a digital signal). This usage follows from the ability to represent a digital signal as a sequence of symbols.

Figure 2:
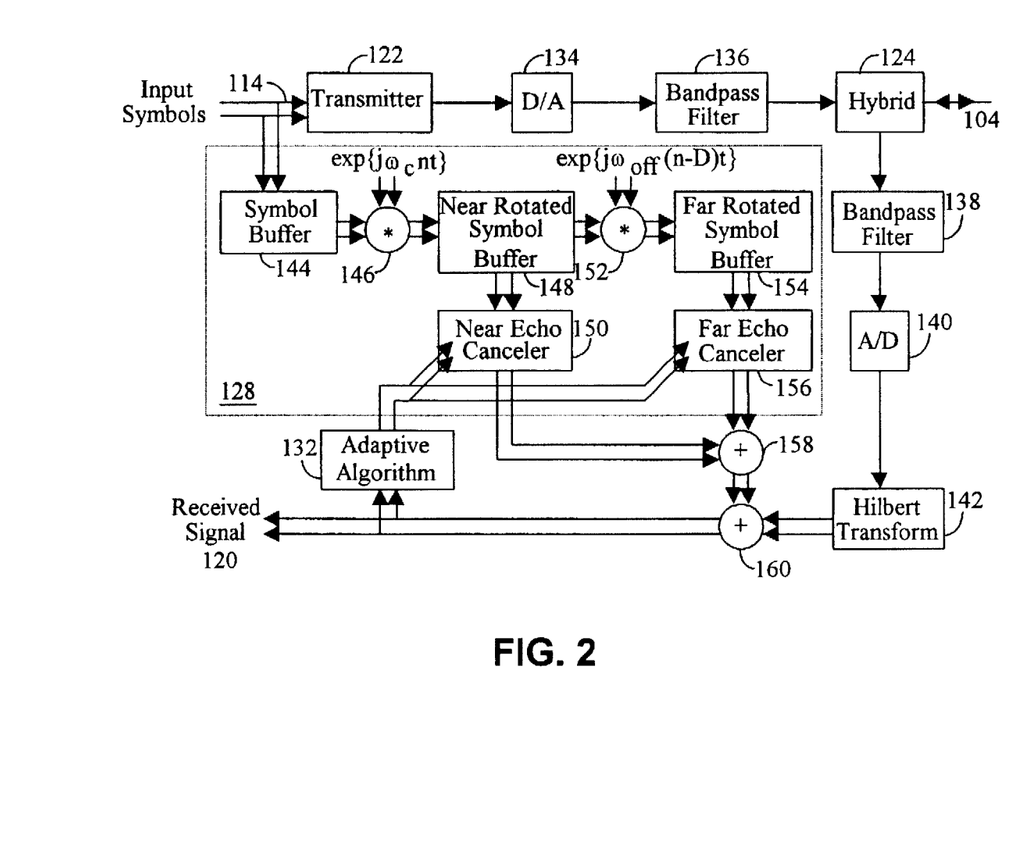
FIG. 2 is a block diagram of a first embodiment of a digital modem with an echo canceler.

In FIG. 2 a block diagram of one embodiment of a digital modem with echo cancellation is shown. Two-dimensional input symbols 114 are accepted by transmitter 122 which then generates a digital transmit signal. The digital transmit signal is then converted to a continuous time transmit signal via digital-to-analog (D/A) converter 134 and bandpass filter 136. The continuous time transmit signal is then coupled to local two-wire bi-directional signal path 104 by hybrid 124.

Hybrid 124 also couples a continuous time receive signal from local two-wire bi-directional signal path 104. The continuous time receive signal is converted to a digital receive signal via a bandpass filter 138 and an analog-to-digital (A/D) converter 140. It should be noted that A/D converter is sampling at some multiple n of the symbol rate. The higher sampling frequency is implemented to avoid a requirement for clock synchronization prior to echo cancellation.

The digital receive signal is coupled to a Hilbert transform filter 142 which provides an analytic receive signal. It is well known that a bandpass signal may be represented as the real part of an analytic signal that expresses the quadrature components of the bandpass signal as a complex-valued signal. See, e.g., Jean-Jacques Werner, "An Echo-Cancellation-Based 4800 Bit/s Full-Duplex DDD Modem," IEEE J. Selected Areas in Communications, vol. 2, no. 5, pp. 722–730, Sept. 1984; and Stephen B. Weinstein, "A Passband Data-Driven Echo Canceller for Full-Duplex Transmission on Two-Wire Circuits," IEEE Trans. Communications, vol. 25, no. 7, pp. 654–666, Jul. 1977 (herein incorporated by reference). In essence this means that at the output of Hilbert transform filter 142, two signals are provided. One signal is the same as the input signal—this represents the real component of the analytic signal described above, also known as the "in-phase component". The other signal is the Hilbert transform of the input signal—this represents the imaginary component of the analytic signal described above, also known as the "quadrature-phase component". In effect, a real-valued signal has been transformed into a complex-valued signal. Receiver 126 will demodulate two-dimensional output symbols from this complex-valued signal. However, before demodulation it is desirable to perform echo cancellation.

Echo canceler 128 comprises a symbol buffer 144 coupled to accept input symbols 114. Symbols from buffer 144 are modulated, or "rotated", by multiplication 146 with a complex sinusoid. The complex sinusoid oscillates at the carrier frequency $\omega_c/2\pi$ and progresses in time steps of nT where T is the sampling period of A/D converter 140 and n is the number of samples per symbol period. This allows for a reduced implementation complexities of filters discussed below. Details of reduced complexity filter implementation are set forth in the Werner article incorporated herein. The rotated symbols are held in a symbol buffer 148 for usage by a near-echo canceler 150. The rotated symbols are subsequently rotated a second time by a multiplication 152 with a second complex sinusoid. The second complex sinusoid oscillates at an adaptively determined offset frequency $\omega_{of}/2\pi$ and progresses in time steps of (n−D)T where D is the measured delay of the second echo. The twice-rotated signals are held in a symbol buffer 154 for usage by far-echo canceler 156.

Near echo canceler 150 is coupled to receive rotated symbols from buffer 148. Near echo canceler 150 takes the form of a linear filter with adjustable coefficients. The coefficients form an approximation of the channel response experienced by the modulated input symbols as they pass from the transmitter across the local part of the communications channel and echo back to the receiver. By convolving (i.e. filtering) the sequence of rotated symbols with the channel response, the near echo canceler generates a replica of the near echo.

Far echo canceler 156 is coupled to receive rotated symbols from buffer 154. Far echo canceler 156 takes the form of a linear filter with adjustable coefficients. The coefficients form an approximation of the channel response experienced by the modulated input symbols as they pass from the transmitter to the remote part of the communications channel and echo back to the receiver. By convolving the sequence of rotated symbols with the channel response, the far echo canceler generates a replica of the far echo.

Summer 158 is coupled to add the replica of the near echo to the replica of the far echo and thereby generate a total echo signal. The total echo signal is then subtracted from the analytic receive signal by summer 160. The resulting echo-canceled signal is then coupled to a receiver for demodulation. An adaptation algorithm module (AAM) 132 is coupled to receive the echo canceled signal. The function of AAM 132 is to iteratively update the coefficients of near echo canceler 150 and far echo canceler 156 in such a way as to minimize any residual echo. AAM 132 is also used to adaptively update the estimate of $\omega_{of}$. AAM 132 is typically implemented using some form of the LMS algorithm.

For reliable information exchange, the SDR must be maintained above a predetermined level. One primary obstacle to achieving this level is inaccurate estimation of the frequency offset of the far echo. It should be noted that for the embodiment of FIG. 2, one error signal is being used to simultaneously update (1) the near echo coefficients, (2) the far echo coefficients, and (3) the offset frequency. The adaptation of items (2) and (3) is complicated by the 40 dB to 50 dB difference in power of the near and far echo components. The estimate of item (3) is further complicated by the inherent non-linearity of the phase-lock loop (PLL) which must be used.

Figure 3:
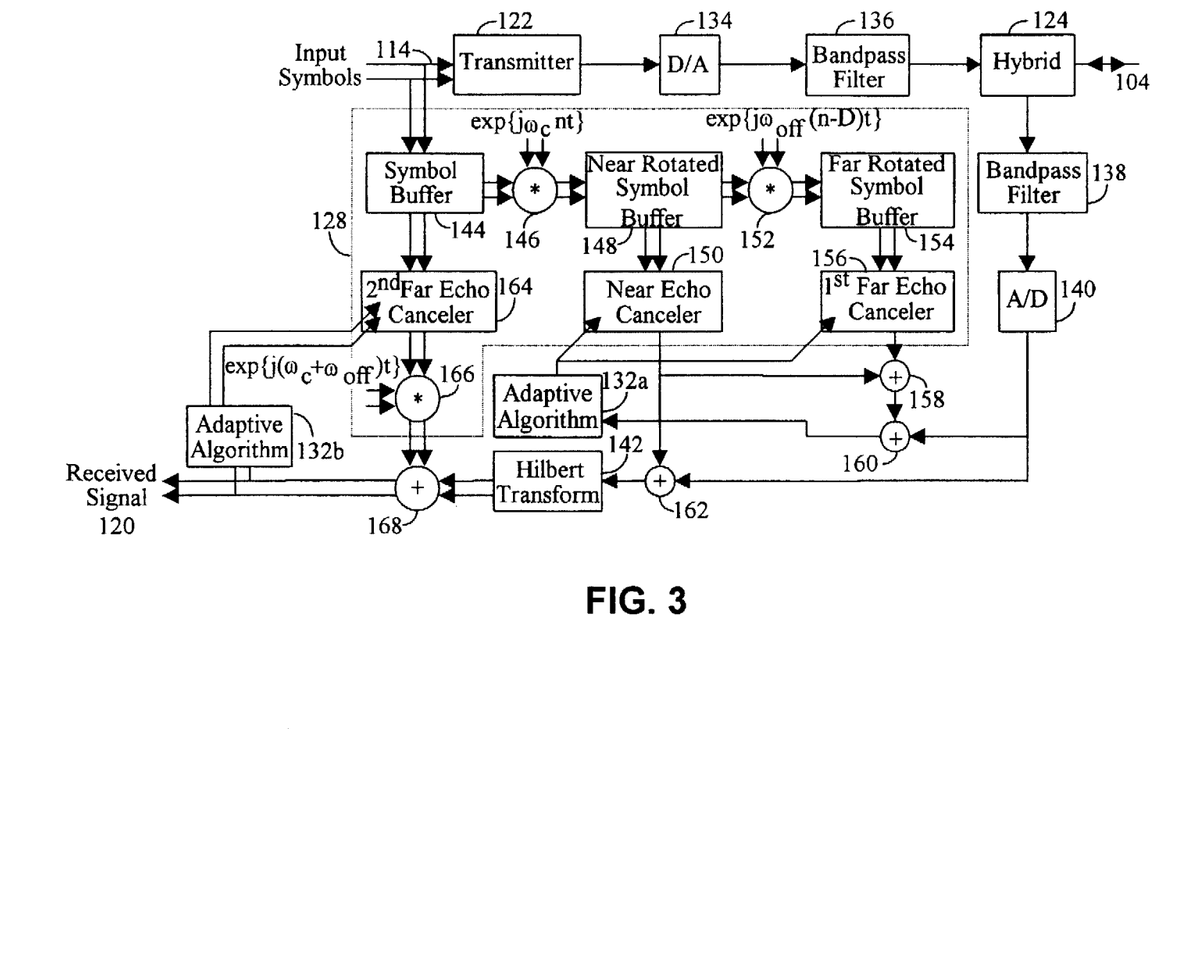
FIG. 3 is a block diagram of a second embodiment of a digital modem with an improved high performance echo canceler.

In FIG. 3, a block diagram of a second embodiment of a digital modem with echo cancellation is shown which addresses the concerns expressed immediately above. The structure of this embodiment differs in the following ways: the use of the Hilbert transform filter (which serves to provide an analytic signal from a real valued signal) is deferred, and only the real part of the output of near echo canceler 150 and far echo canceler 156 are used for echo cancellation. Summers 158 and 160 operate to remove the echo from the digital receive signal and thereby produce a real-valued error signal. AAM 132 is split into two modules 132a and 132b. AAM 132a operates on the error signal to iteratively update the coefficients of near echo canceler 150 and far echo canceler 156. An advantage gained by this approach is a reduced coefficient noise variance, resulting in a more accurate replica of the near echo. AAM 132a does not form an estimate of the offset frequency ($\omega_{of}$). Rather, the offset frequency is obtained in a more accurate manner which will be described below. This allows for more accurate adaptation of the coefficients of far echo canceler 156.

Separate from the real-domain adaptation loop and the accuracies described above, summer 162 is coupled to remove the replica of the near echo from the digital receive signal. The near-echo canceled signal is passed through Hilbert transform filter 142 to produce an analytic near-echo canceled signal. A summer 168 then removes an analytic far-echo signal from the analytic near-echo canceled signal to produce echo canceled signal 120. The analytic far-echo signal is generated by means of a second far echo canceler 164. Far echo canceler 164 is coupled directly to symbol buffer 144. Note that signal modulation does not occur prior to the filtering operation. Far echo canceler 164 takes the form of a linear filter with adjustable coefficients. The coefficients form an approximation of the channel response experienced by input symbols 114 as they pass through the transmitter to the remote part of the communications channel and echo back to the receiver. By convolving the sequence of input symbols with the channel response, the far echo canceler generates an analytic low-pass replica of the far echo. The analytic low-pass replica is then modulated by a multiplication 166 with complex sinusoid. The complex sinusoid oscillates at the carrier frequency $(\omega_c + \omega_{off})/2\pi$ and progresses in time steps of T. The resulting analytic far echo signal is coupled to summer 168.

The second AAM 132b operates on the analytic error-canceled signal to iteratively update the coefficients of second far echo canceler 164. AAM 132b also generates an estimate of $\omega_{off}$. The configuration of this adaptive loop with the modulation occurring after the filtering provides a higher sensitivity of the adaptation algorithm to $\omega_{off}$, thereby permitting a high accuracy estimate of the offset frequency. In addition, since the near echo has been essentially removed, the second adaptation loop does not suffer the dominating interference of the near echo. This permits a more focused optimization of update parameters for adaptation of second far echo canceler coefficients.

In effect, this embodiment achieves improved performance by splitting the adaptive algorithm module in the described manner. The second adaptation stage achieves a high accuracy estimation of the far echo characteristics and frequency offset due to the removal of the dominating influence of the near echo by the first stage. The first stage in turn achieves better performance by the better estimation of the frequency offset provided by the second stage.

As noted previously, summer 130 is functionally replaced by two summers, summer 162 and summer 168. The output of summer 168 is forwarded to receiver 126.

Numerous variations and modifications will become apparent to those skilled in the art once the above disclosure is fully appreciated. This is particularly true since the point at which conversion from real-valued signals to complex-valued signals may be arbitrarily chosen. Similarly, the digital-to-analog and analog-to-digital conversions may be postponed or advanced along the signal flow stream. It is intended that the following claims be interpreted to embrace all such variations and modifications.

What is claimed is:

1. A system for performing echo cancellation in a communications network, comprising:

a local bi-directional two-wire communication line;

a remote bi-directional two-wire communication line;

a four-wire communication line interposed between said local line and said remote line, said four-wire communication line having a transmit path and a receive path, wherein said transmit path is adapted to transfer a transmit signal from said local line to said remote line, and said receive path is adapted to transfer a receive signal from said remote line to said local line;

a local hybrid transformer coupled between said local line and said four-wire line and configured to perform two-wire to four-wire circuit conversion to transfer the transmit signal from said local line to said four-wire line and transfer the receive signal from said four-wire line to said local line, wherein the local hybrid transformer imputes a near echo of the transmit signal upon the receive signal;

a remote hybrid transformer coupled between said four-wire line and said remote line and configured to perform four-wire to two-wire circuit conversion to transfer the transmit signal from said four-wire line to said remote line and transfer the receive signal from said remote line to said four-wire line, wherein the remote hybrid transformer imputes a far echo of the transmit signal upon the receive signal;

a modem which comprises:

a transmitter configured to accept a sequence of input data and thereafter provide said transmit signal;

an echo canceler comprising:

a symbol buffer coupled to receive said sequence of input data;

a first filter operatively coupled to receive a modulated output from said symbol buffer for providing a replica of said far echo in a real domain;

a second filter coupled to said symbol buffer and configured to provide a replica of an analytic representation of said far echo in a complex domain;

a third filter operatively coupled to receive a second modulated output from said symbol buffer for providing a replica of said near echo;

a first summer configured to accept said receive signal and the replica of said near echo for providing a near-echo canceled signal; and a summer configuration coupled to said first filter to accept the replica of said far echo, coupled to said third filter to accept the replica of said near echo, configured to accept said receive signal, and configured to provide an error signal which is coupled to update coefficients of said first and third filters in accordance with an adaptation algorithm.

2. The system for performing echo cancellation as recited in claim 1, wherein said modem further comprises:

a Hilbert transform filter coupled to said first summer to accept said near-echo canceled signal, and configured to provide an analytic receive signal;

a second summer coupled to said Hilbert transform filter and said second filter for combining said analytic receive signal and said analytic representation of said far echo, the result of the combination being an analytic echo-canceled signal; and a receiver coupled to said second summer to accept said analytic echo-canceled signal and thereafter provide a sequence of output data.

3. The system for performing echo cancellation as recited in claim 2, wherein said analytic echo-canceled signal is coupled to update coefficients of said second filter.

4. An echo cancellation apparatus comprising:

a symbol buffer configured to receive a sequence of input data;

a first filter in operable communication with the output of said symbol buffer for providing a replica of a far echo in a real domain;

a second filter coupled to said symbol buffer and configured to provide a replica of an analytic representation of said far echo in a complex domains;

a third filter in operable communication with the output of said symbol buffer for providing a replica of a near echo;

a first summer configured to accept a receive signal and coupled to said third filter to accept the replica of said near echo and configured to provide a near-echo canceled signal; and a summer configuration coupled to said first filter to accept the replica of said far echo, coupled to said third filter to accept the replica of said near echo, configured to accept said receive signal and configured to provide an error signal which is coupled to update coefficients of said first and third filters in accordance with an adaptation algorithm.

5. The echo cancellation apparatus as recited in claim 4, said apparatus further comprising:

a Hilbert transform filter coupled to said first summer to accept said near-echo canceled signal, and configured to provide an analytic receive signal; and a second summer coupled to said Hilbert transform filter to accept said analytic receive signal, coupled to said second filter to accept said analytic representation of said far echo, and configured to provide an analytic echo-canceled signal.

6. The echo cancellation apparatus as recited in claim 5, wherein said analytic echo-canceled signal is coupled to update coefficients of said second filter.

7. A method for echo cancellation in a communications network comprising the steps of:

buffering a sequence of input data;

applying a first filter to said sequence of input data to construct an estimate of a far echo in a real domain;

applying a second filter to said sequence of input data to construct an analytic representation of said far echo in a complex domain;

applying a third filter to said sequence of input data to construct an estimate of a near echo in a real domain;

subtracting the estimate of said far echo and the estimate of said near echo from a receive signal to determine an error signal for providing filter coefficient updates to said first and third filters;

subtracting the estimate of said near echo from said received signal to determine a near-echo canceled signal;

applying a Hilbert transform to said near-echo canceled signal to determine an analytic receive signal; and subtracting the analytic representation of said far echo from said analytic receive signal to produce an echo-canceled signal.

8. The method for echo cancellation as recited in claim 7 further comprising the steps of:

applying a first adaptation algorithm to coefficients of the first filter based on said error signal; and applying a second adaptation algorithm to coefficients of the second filter based on said error-canceled signal.

* * * * *

UNITED STATES PATENT AND TRADEMARK OFFICE
CERTIFICATE OF CORRECTION

PATENT NO. : 5,790,658
DATED : August 4, 1998
INVENTOR(S) : Phillip C. Yip, et al.

It is certified that error appears in the above-indentified patent and that said Letters Patent is hereby corrected as shown below:

Claim 4, col. 10, line 51, delete the word "domains" and substitute therefor --domain--.

Signed and Sealed this

Twenty-seventh Day of March, 2001

*Attest:*

NICHOLAS P. GODICI

*Attesting Officer* — *Acting Director of the United States Patent and Trademark Office*